United States Patent [19]

Vetter et al.

[11] 4,398,883
[45] Aug. 16, 1983

[54] PACKAGING MACHINE

[75] Inventors: Artur Vetter; Emmerich Medwed, both of Wolfertschwenden, Fed. Rep. of Germany

[73] Assignee: Multivac Sepp Haggenmuller KG, Wolfertschwenden, Fed. Rep. of Germany

[21] Appl. No.: 242,344

[22] Filed: Mar. 10, 1981

[30] Foreign Application Priority Data

Mar. 14, 1980 [DE] Fed. Rep. of Germany ... 8007088[U]

[51] Int. Cl.³ ............................ F24J 3/00; D06F 75/08
[52] U.S. Cl. ..................................... 432/225; 219/245; 219/345; 264/322; 264/548
[58] Field of Search ................ 264/322, 548; 432/225; 219/245, 345

[56] References Cited

U.S. PATENT DOCUMENTS 1,644,255 10/1927 Kercher et al. ..................... 219/345
2,702,411 2/1955 Winstead ............................. 264/548

FOREIGN PATENT DOCUMENTS 1188791 3/1965 Fed. Rep. of Germany .
1424320 11/1965 France ................................. 219/245
553094 8/1974 Switzerland .
580521 10/1976 Switzerland .

Primary Examiner—John J. Camby
Attorney, Agent, or Firm—Donald Brown

[57] ABSTRACT

A packaging machine which has a station in which a thermoplastic packaging foil is heated to its thermoplastic state by contacting with the surface of a heating plate. The contacting surface of the heating plate has a plurality of raised zones adjacent to and surrounded by interconnected retracted zones which together form a venting channel for preventing the inclusion of any residual air between the foil and the contacting surface of the heating plate. The raised zones are generally convex in shape, with continuous curvature towards the retracted interconnected and surrounding zones so that, in use, the foil may be applied across its total surface on the contacting surface of the heating plate without inclusion of residual air therebetween, thus achieving uniform heating of the packaging foil and avoiding any deformation or warping thereof.

5 Claims, 4 Drawing Figures

PACKAGING MACHINE

BACKGROUND OF THE INVENTION

This invention generally relates to packaging machines, particularly to packaging machines in which a thermoplastic packaging foil is heated to its thermoplastic state by contacting one surface thereof with the surface of a heated plate.

Conventional packaging machines using heated thermoplastic foils have a heating plate for contacting one surface of the packaging foil to heat the same to its thermoplastic state. In order to prevent inclusions of air between the heating plate and the foil, the heated contacting surface of the plate is provided with narrow grooves or channels to vent any residual air. The grooves or channels are connected with venting openings extending through the heating plate. Providing the heating plate with this kind of venting channels substantially increases the manufacturing cost and therefore is undesirable.

Another attempt to prevent the inclusion of residual air between the heating plate and the foil is to provide the contacting surface of the heating plate with a pattern of projecting or raised members. In this case, however, the foil will only contact these raised members so that it cannot be heated in uniform manner and will show a structure corresponding to the pattern of the raised members. This is obviously undesirable for many purposes.

OBJECTS OF THE INVENTION

It is a primary object of the invention to provide a packaging machine for use with a thermoplastic packaging foil avoiding any inclusions of residual air between the foil and the contacting surface of the heating plate.

A further object of the invention is to provide a packaging machine for use with thermoplastic packaging foils and having a heating plate the contacting surface of which may be structured to provide venting means for venting any residual air without, however, preventing the foil to contact substantially the entire surface of the heating plate to be uniformly heated thereby.

A further object of the invention is to provide a packaging machine for use with thermoplastic packaging foils and having a heating plate for heating the packaging foil to its thermoplastic state substantially without inclusions of air between the contacting surface of the heating plate and the packaging foil, without requiring a complex structure of the contacting surface which would cause increased manufacturing costs.

SUMMARY OF THE INVENTION

In accordance with the invention, the packaging machine has at least one station in which a packaging foil of thermoplastic material is heated to its thermoplastic state so that it can be further processed in view of the desired packaging operation. Heating of the packaging foil to its thermoplastic state is performed by contacting one surface of the foil with a contacting surface of a heating plate. The heated contacting surface has a plurality of first zones adjacent to interconnected second zones together forming a venting channel for venting any residual air between the heated contacting surface and the packaging foil. The first zones have a generally convex shape with continuous curvature towards the adjacent and surrounding second zones.

In accordance with preferred embodiments, the first zones have generally flat top surfaces with peripheral portions continuously sloping towards the surrounding second zones. The second zones define a common plane, and the first zones are raised over this common plane. Between adjacent first zones the second zones have narrow interconnecting portions forming interconnected venting channels.

In use, when the packaging foil is moved towards the contacting surface of the heating plate to be heated thereby to its thermoplastic state, the foil will first contact the substantially flat or plane top portions of the first zones and then progressively contact the peripheral portions of the first zones sloping continuously towards the surrounding second zones. Finally, the foil will reach the peripheral base portions of the raised first zones smoothly extending into the surrounding second zones. Thus, at the end of the contacting operation, the foil will also contact the second zones so that it will be uniformly contacted by the heating plate to be heated thereby in uniform manner.

DESCRIPTION OF A PREFERRED EMBODIMENT

Further advantages, objects and features of the invention will stand out from the following description of preferred embodiments of the invention with reference to the drawings in which.

Figure 1:
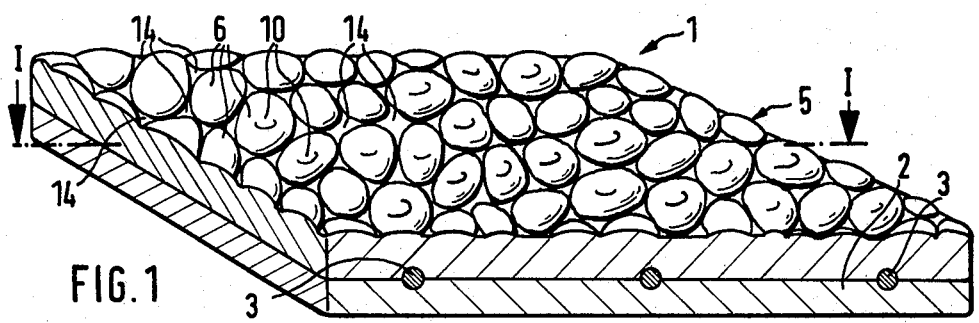
FIG. 1 shows a perspective view of a heating plate of the inventive packaging machine.
Figure 2:
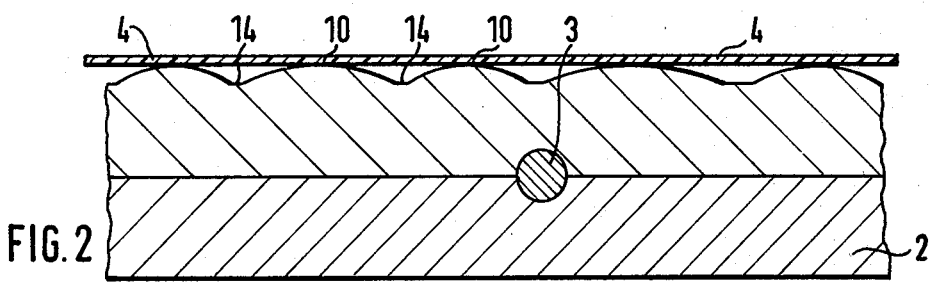
FIG. 2 is a cross-section along line I—I in FIG. 1 at an enlarged scale, a thermoplastic packaging foil being applied in a first position.

Referring to FIG. 1, the heating plate 1 is made of a base portion 2 having heating members 3 extending therethrough. The contacting surface 5 of the heating plate 1 to be brought into contact with a thermoplastic packaging foil 4 is provided with a plurality of first zones 6 which, as best shown in FIG. 2, are formed in such a manner that they are preferably provided with flat or substantially plane top portions 10 from which the first zones respectively extend towards a second zone 14 in a continuously sloping manner. The second zone is substantially plane. Any first zone is completely surrounded by a second zone, and the second zones are interconnected with each other and with adjacent second zones surrounding adjacent first zones. Thus, the first zones are raised over the surface formed by the plurality of second zones forming a plurality of islands within a common plane.

The shape of the first zones 6 is preferably convex or lens-shaped, with continuous curvature; as shown in FIG. 1, however, the first zones may have substantially plane top portions and peripheral portions continuously sloping towards the second zones 14. Preferably, as shown in FIG. 1, the first zones have a maximum dimension or diameter of about 10 millimeters. A preferred range of the dimensions of the first zones is 3 to 10 mm, preferably 5 to 8 mm. Between any two adjacent first zones, the second zones have narrow interconnecting portions or channels so that all of the second zones are in communication with each other. The width of the narrow interconnecting channel may be selected within a range of 0.05 to 1 mm, preferably 0.1 to 1 mm, most preferably 0.1 to 0.5 mm.

Preferably, the first zones 6 are raised with respect to the common plane of the second zones 14 by an amount of 0.1 to 0.5 mm, the maximum height being measured at the top portions 10.

To heat the thermoplastic packaging foil 4, it is brought into contacting engagement with the contacting surface 5 of the heating plate 1. Preferably, the packaging foil is clamped at two opposed sides and then urged against the heating plate using air pressure. An initial contact between the foil and the heating plate is established at the raised first zones distributed over the entire contacting surfaces of the heating plate. In this first stage, most of the residual air between the foil and the heating plate will be vented through the continuous channel formed by the interconnected second zones. Thus, the residual air will be vented at the edges of the heating plate. The foil will progressively contact the first zones from their top portions 10 towards their peripheral portions and will finally also contact the second zones 14. At this time, any residual air will be completely vented. Thus, the foil will be in continuous and uniform contact with the contacting surface of the heating plate, avoiding any inclusions of residual air therebetween. Another advantageous result is that heat transmission from the heating surface to the foil surface will be distributed over many locations of the foil, already at the first contacting moment, thus avoiding any deformation or warping of the foil. This also contributes to a uniform heating of the foil.

Figure 3:
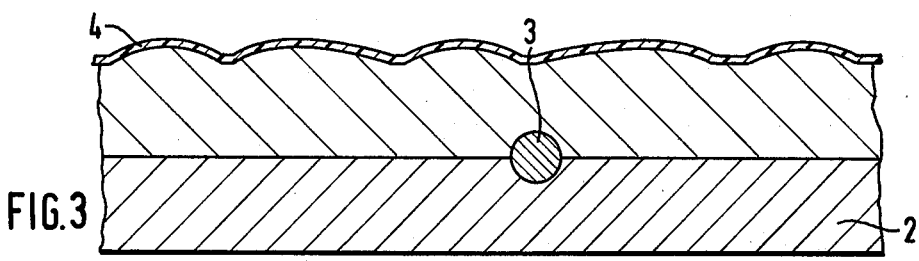
FIG. 3 shows a cross-sectional view along line I—I in FIG. 2 at an enlarged scale, with the packaging foil shown in a second position.

FIG. 2 shows the foil contacting the raised surface portions of the first zones. In this stage, the residual air may escape through the channels formed by the second zones, in the manner disclosed above. Subsequently, the foil will progressively be applied to the entire contacting surface 5 of the heating plate 1, in the manner shown in FIG. 3, and as soon as the foil 4 is heated, it may be separated from the contacting surface 5 to be subjected to any further processing operation desired.

Figure 4:
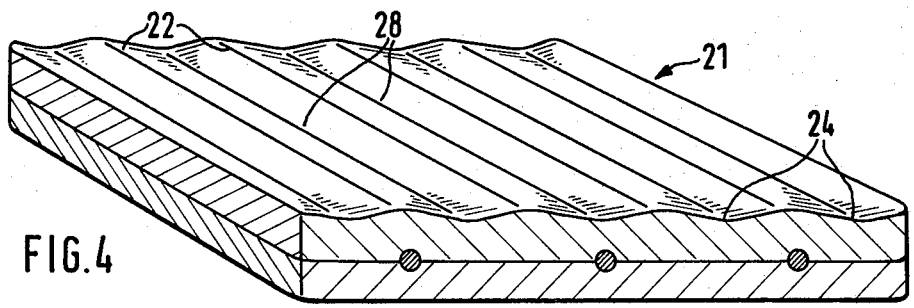
FIG. 4 shows a perspective view of another embodiment.

FIG. 4 shows an embodiment of a heating plate 21 having an essentially wave-shaped surface. The bottom portions 24 provide venting channels 28 leading towards the edge of the heating plate. With this embodiment, too, the packaging foil will start contacting raised portions 22 of the heating plate. Any residual air between the heating plate and the foil will be vented through the channels 28 extending outwardly, and finally the foil will completely apply across its total surface to the contacting surface of the heating plate 21.

Obviously, the first disclosed embodiment will permit a better venting of residual air between the packaging foil and the contacting surface of the heating plate, in view of the many branched channels extending into all directions and towards the edges of the heating plate. Further, heating by the large number of initial contacting locations will be more uniform as compared with the second embodiment, in view of the many first zones distributed in all directions in uniform manner. On the other hand, the surface shown in FIG. 4 is advantageous in view of easy manufacture.

The embodiments disclosed above have venting channels formed by the second zones which extend to the edge of the heating plate in uninterrupted manner. However, these venting channels may also lead to venting openings provided in the heating plate. However, extending the channels towards the edge of the heating plate is advantageous inasmuch as any bores or openings in the heating plate are avoided, which openings may tend to be obstructed with extended use.

The contacting surface of the heating plate may be provided with a coating of an appropriate material, e.g. Teflon, to avoid adhering of the contacting packaging foil.

It should be understood that the above description is in no way limitative to the embodiments disclosed and that many modifications and improvements may be brought thereto without departing from the true spirit of the invention.

What is claimed is:

1. A packaging machine having at least one station in which a packaging foil of thermoplastic material is heated to its thermoplastic state by contacting one surface of said foil with the heating surface of heating means, said heating surface comprising a plurality of spaced-apart protrusions between which there is a system of interconnected channels which completely encompass each protrusion and which collectively define a common plane from which the protrusions rise and passages in all directions from any part of the surface to an edge of the surface wherein the protrusions have relatively broad top surfaces and generally convex side surface which merge at their bases with the surfaces of the channels between protrusions and wherein the transverse dimensions of the protrusions are preferably from 5 to 8 millimeters, the height of the protrusions is 0.1 to 0.5 millimeters and the transverse dimensions of the spaces between protrusions from 0.1 to 0.5 millimeters.

2. A packaging machine according to claim 1 wherein the protrusions are randomly arranged and of different size and shape.

3. A packaging machine according to claim 1 wherein said protrusions have generally broad top surfaces.

4. A packaging machine according to claim 3 wherein said generally broad top surfaces define a common top surface plane.

5. A packaging machine having at least one station in which a packaging foil of thermoplastic material is heated to its thermoplastic state by contacting one surface of said foil with the heating surface of heating means, wherein said heating surface comprises spaced, parallel, longitudinally-extending protrusions having relatively broad top surfaces and generally convex side surfaces between which there are channels with which the side surfaces merge characterized such that the distance between two successive protrusions is within a range of substantially 3 to 10 millimeters, preferably 5 to 8 millimeters, and the height of the protrusions above a comon plane defined by the bottoms of the channels is preferably 0.1 to 0.5 millimeters.

* * * * *